B. C. BATCHELLER.
CARRIER SYSTEM.
APPLICATION FILED OCT. 31, 1912.
1,061,214.
Patented May 6, 1913.
3 SHEETS—SHEET 2.
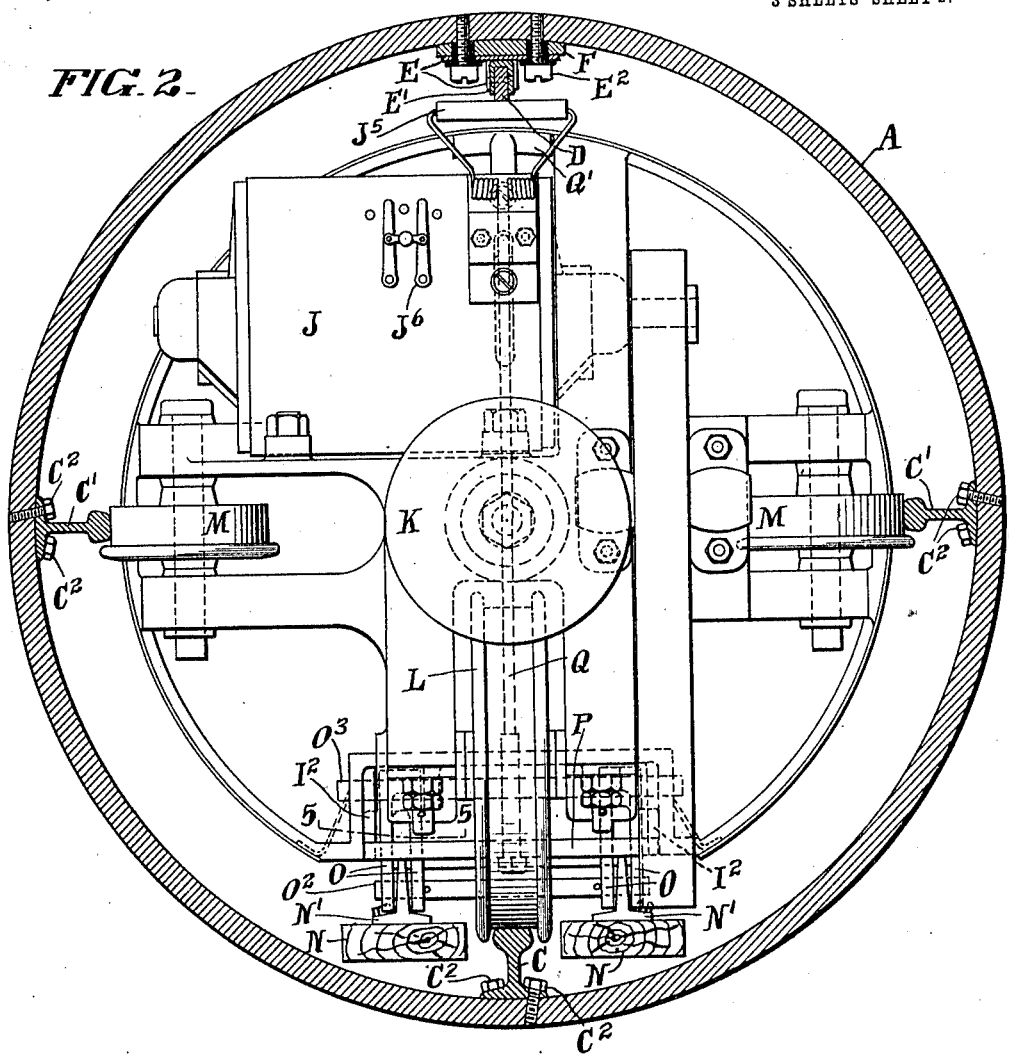
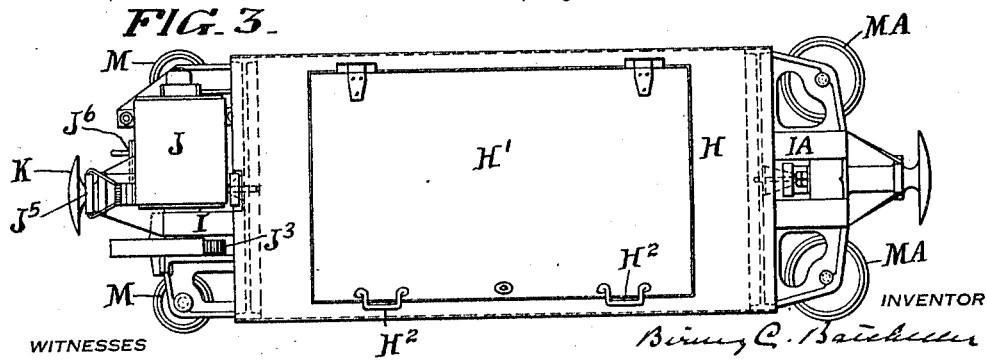

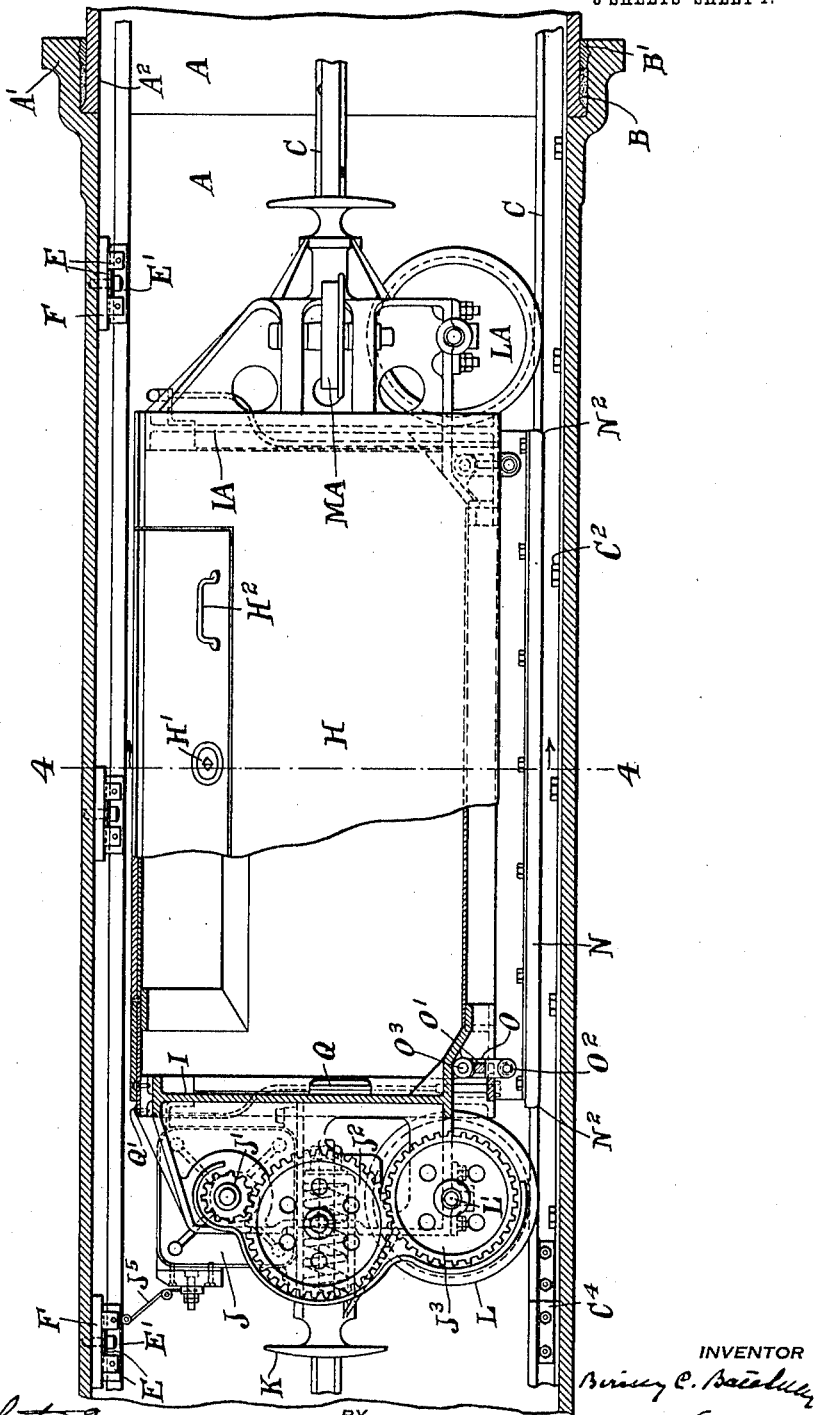

B. C. BATCHELLER.
CARRIER SYSTEM.
APPLICATION FILED OCT. 31, 1912.
1,061,214.
Patented May 6, 1913.
3 SHEETS—SHEET 3.
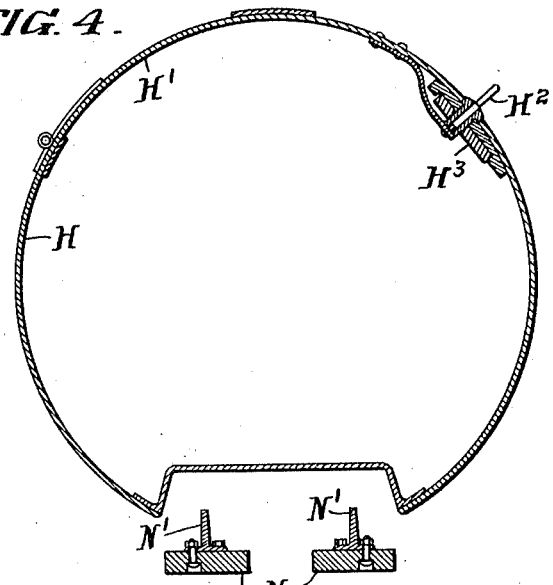
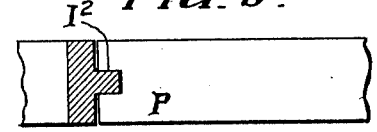
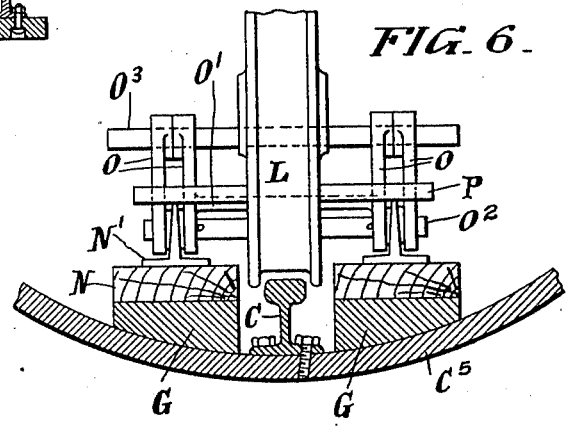
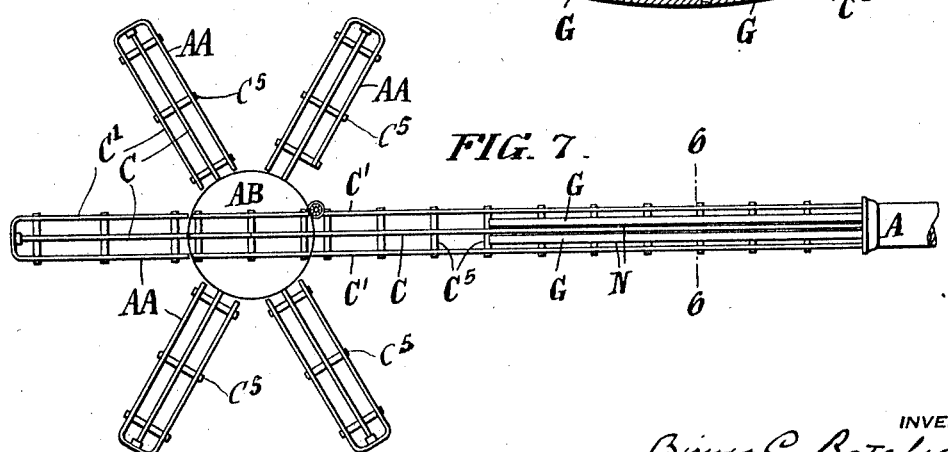
WITNESSES
INVENTOR
Birney C. Batcheller
BY
his ATTORNEY

UNITED STATES PATENT OFFICE.

BIRNEY C. BATCHELLER, OF NEW YORK, N. Y.

CARRIER SYSTEM.

1,061,214.  Specification of Letters Patent.  Patented May 6, 1913.

Original application filed February 20, 1912, Serial No. 678,893. Divided and this application filed October 31, 1912. Serial No. 728,775.

*To all whom it may concern:*

Be it known that I, BIRNEY C. BATCHELLER, a citizen of the United States, residing in the city of New York, borough of Brooklyn, and State of New York, have invented a certain new and useful Improvement in Carrier Systems, of which the following is a true and exact description, reference being had to the accompanying drawings, which form a part thereof.

My present invention relates to carrier systems of the kind in which motor driven carriers unattended by operators are employed to transmit mail, parcels and the like between the various stations of the system.

The main object of the invention is to provide a simple, reliable and effective carrier construction having supporting and guiding wheels so disposed with respect to the coöperating track rails that the carriers can be operated, and in particular can turn sharp corners at high speed.

Carrier systems of the kind to which my invention relates are ordinarily installed underground and the motors on the carriers are ordinarily electric motors receiving current from storage batteries on the carriers or through a traveling contact with a stationary conductor.

The various features of novelty which characterize my invention are pointed out with particularity in the claims annexed to and forming a part of this specification. For a better understanding of the invention, however, and the advantages possessed by it, reference should be had to the accompanying drawings and descriptive matter in which I have illustrated and described a preferred form in which my invention may be embodied.

Of the drawings: Figure 1 is a sectional elevation of a section of transit tubing with a carrier in place therein, said carrier being partly broken away and in section. Fig. 2 is a transverse section of the transit tubing of Fig. 1 with the carrier shown in end elevation. Fig. 3 is a plan view of the carrier shown in Figs. 1 and 2. Fig. 4 is a sectional elevation on the line 4—4 of Fig. 1. Fig. 5 is a partial section taken on the line 5—5 of Fig. 2. Fig. 6 is a view partly in section on the line 6—6 of Fig. 7, illustrating the operation of the means for checking the carrier as it approaches a station; and Fig. 7 is a somewhat diagrammatic representation of the transit tubing and terminal station of a single track carrier system.

In the form shown in the drawings the body of the guide way for the carriers is a transit tube formed of pipe sections A, which may be, and are shown as being identical with the cast iron water and sewer pipes in common use. As shown each section A is formed at one end with a bell A' and at the other end with a spigot $A^2$ adapted to be entered in the bell end of an adjacent section, and as shown, the joints between the adjacent sections are made watertight by the usual yarn and lead calking material B and B' respectively. Within the transit tube and at the bottom of the latter, there is secured a carrier supporting and guiding track rail C. As shown, this rail is of T-section with the underside of the base flange rounded to the curvature of the transit tubing. The rail is secured in place by bolts $C^2$ passing through the base flange of the rail and tapped into the pipe sections A. Guide rails C', C' are secured to the opposite sides of the transit tubing at about the level of the axis of the tubing. These rails may be identical in shape with the rails C and are shown as secured in place in a similar manner by bolts $C^2$. The track rails C and C' may be formed in sections of any desired length and connected together by fishplates $C^4$ of usual form, and ordinary securing bolts. Preferably the rail sections are so disposed that the joints in the rails do not coincide with the joints between the pipe sections A.

In the particular arrangement of transit tubing and terminal stations shown in Fig. 7 a turn-table AB is provided at some distance from the mouth of the tube formed by the pipe sections A proper. The rails C and C' extend, however, directly to the turn-table AB, being supported by brackets $C^5$ so that this portion of the carrier guideway is open. Radially disposed with respect to the turn-table AB are storage receptacles or cages AA which have rail sections C and C' supported by brackets $C^5$ and the turn-table AB is provided also with rail sections C and C' supported by brackets $C^5$. The track rails C and C' of the turn-table are brought into register with the main track rails C and C' and with the track rails C and C' of the storage cages AA, as conditions make desirable. To the bottoms of the supports $C^5$ adjacent the end of the transit tube proper are secured stationary skids GG arranged at each side of the rail C, as shown best in Fig. 6. These skids are employed for purposes hereinafter described.

In the particular form of apparatus disclosed the carriers are provided with and driven by electric motors receiving current from an overhead conductor D which is secured at intervals to the top of the transit tube sections A by means of metal clips E which are secured to the overhead conductor but are insulated therefrom by the insulation $E^1$; and are secured to the transit tubing by bolts $E^2$ which are insulated from the clips E. The latter are spaced away from the metallic tube sections A by interposed blocks of wood F, or other insulating material. This overhead conductor preferably terminates adjacent each terminal at the end of the tube proper.

The carrier shown in Figs. 2, 3 and 4 comprises a tubular body H advantageously formed of sheet metal and provided with a hinged door H' at the top adapted to be locked in place by an internal button $H^3$. $H^2$, $H^2$, represent handles for opening and closing the door. The ends of the tubular body H are secured to end members I and IA which are similar in construction except for the features hereinafter referred to. The end member I is formed of cast metal and is provided with flanges and ribs to give it the desired strength and shape and at the same time minimize the weight of the carrier. Secured to the end member I is an electric motor J the shaft of which carries a gear J' which meshes in turn with an idle gear $J^2$. The idle gear $J^2$ meshes in turn with a gear $J^3$ carried by the shaft L' of a main carrier supporting wheel L which runs on the central rail C and is provided with flanges at each side of the rail. The motor receives current from the overhead conductor D through a bow trolley $J^5$ of familiar type. $J^6$ represents a reversing switch mechanism by which the carrier may be adjusted to run in either direction. Axially mounted on the end member I is a spring buffer K. Journaled to the end member I on opposite sides are horizontal wheels M, M, engaging the side rails C', C' and formed each with a flange at its underside. The end member IA with attached parts differs from the end member I primarily in the omission of the motor J and of any driving connections for the shaft of the wheel LA which may be identical with the wheel L. The sidewheels MA journaled in the member IA may be identical in construction and arrangement with the wheels M connected to the head I, though as shown, the wheels MA are made larger in diameter than it is convenient to make the wheels M. Beneath the carrier body are mounted two skids, N, N, adapted to coöperate with the stationary skids G, G, heretofore described, in arresting the motion of the carrier. As shown, the skids N, N, are of wood with their ends rounded off as indicated at $N^2$. To the upper side of each skid N is secured a flanged metal bar N' running longitudinally of the skid. The skids N are connected to the carrier proper by swinging link structures, one at each end of the carrier, and each comprising link members O arranged in pairs which straddle the vertical flanges of the stiffening bars N' attached to the skids N. As shown each pair of link members O are connected by integral hub portions and the inner links for the two skids at each end of the carrier are connected by a stiffening bar O'. The lower ends of the links O at each end of the carrier are pivotally connected to the two skids N by the pin or shaft $O^2$ passing through the vertical flanges of the two stiffening bars N', and each link structure is pivotally connected to the corresponding end member I or IA by a pin or shaft $O^3$ passing through suitably disposed lugs formed on the end member.

Normally the links and skids are held rigidly in the position relative to the carrier shown in Figs. 2 and 3, by locking bars P, P, which are formed with notched ends receiving the vertical guide ribs $I^2$, $I^2$, carried by the corresponding end members I and IA, as shown best in Fig. 5. Each of these locking bars P may be lifted into the position to allow the corresponding link structure and the adjacent ends of the skids N to swing toward the lifted locking bar, by means of a rod Q which passes up through the carrier body at the inner side of the corresponding end member to a point adjacent the upper end of the carrier where the rod is bent and passes through a slot formed for the purpose in the portion of the end member closing the end of the carrier body proper. At its upper end each rod Q is provided with a handle Q' which in the normal position of the apparatus is slightly below the top of the car. The rods Q with their handles Q' insure the locking of the skids N in their normal position when the carrier is passing through the transit tubing, for when the skids are unlocked the handles Q' project above the body of the car a distance sufficient to prevent the carrier from passing into the transit tube.

In operation the carrier after being loaded and after having the skids locked in their normal position is started with a push into the transit tube proper whereupon the motor receiving current from the overhead conductor D through the trolley $J^5$ quickly brings the carrier up to speed, and it is one of the main advantages of the invention that a carrier constructed as described, and running along track supporting and guide rails, arranged as described, can be operated at high speeds and can turn the sharp curves which in the practical use of this apparatus it is frequently found necessary to give the transit tubing without slowing down the car, and without requiring any adjustment of the current supply to the motor. When the carrier traveling at high speed reaches a sharp curve the centrifugal force acting on the carrier tends of course to throw the carrier outward, but this tendency is effectually resisted by the engagement of the proper lateral guide wheels M and MA with the corresponding guide rails C′, which are arranged at about the level of the center of gravity of the carrier. This arrangement obviates all necessity for the superelevation of the outer rail necessary at curves in guideways in which the carriers run on weight supporting rails. The flanges on the two sides of the wheels L and LA and the bottom flanges of the wheels M and MA prevent the carrier from jumping off the rails at any time.

Preferably as shown the axes of the supporting and two lateral guide wheels at each end of the car lie in the same vertical plane, transverse to the length of the carrier as this gives a marked advantage when it is desired to have the carrier turn sharp angles at high speeds. It will be understood the carrier driving motor should be of such a character or the carrier should have such controlling devices that a desired maximum will not be exceeded. For instance the carrier motor may well be an electric motor having its field energized in normal running by a shunt winding.

The transit tube formed of pipe sections A, described may be installed rapidly and easily, and this form of transit tube is highly advantageous on this account and because of its durability and the ease with which it may be made water-tight. No claim is made herein, however, to the specific construction of the transit tubing proper, as that forms the subject matter of my co-pending application, Serial No. 678,892, filed February 20, 1912.

When the carrier approaches a point at which it is to be stopped, as for instance, such a station as is shown in Fig. 7, the skids N of the carrier engage the stationary skids G, G, located at that point. The two sets of skids are so relatively arranged that when they are in engagement the carrier is lifted to more or less completely raise the wheels L and LA clear of the rail C so that all or a substantial part of the weight of the carrier is made use of in creating frictional resistance between the movable and stationary skids N and G, respectively, which quickly brings the carrier to rest. After the carrier is brought to rest in this manner one of the locking bars P, ordinarily the rear one, is lifted to unlock the skids, whereupon the carrier proper may swing forward on the links O until the weight of the carrier is again transferred to the rail C through the wheels L and LA. The carrier may then be readily moved by hand on to the turn-table AB, or may otherwise be manipulated as conditions may require. The carrier system disclosed is primarily intended for underground installation and to be used in large cities for transmitting mail or parcels through considerable distances. The particular apparatus disclosed was primarily designed for use in a system in which the pipe sections A are about thirty inches in diameter and the overall length of the carrier is about seven feet. It will be understood, however, that the dimensions given are merely illustrative and that the diameter of the pipe sections and the length of the carrier may be made larger or smaller as conditions require. The provisions of the buffers K, K, limit the liability to injure in case of collision of one carrier with another carrier or with other objects.

Novel features of the construction and arrangement of the means disclosed herein for arresting the motion of a carrier at a predetermined point are claimed in my application, Serial No. 678,893, filed February 20, 1912, of which this case is a division.

While in accordance with the provisions of the statutes I have illustrated and described the best form of my invention now known to me, it will be apparent to those skilled in the art that changes may be made in the form of the apparatus disclosed without departing from the spirit of my invention, and that under some conditions certain features of my invention may be used with advantage without a corresponding use of other features.

Having now described my invention, what I claim as new and desire to secure by Letters Patent, is:

1. In a carrier system the combination with a single supporting track rail and an opposed pair of lateral guide rails, of a carrier having rigidly connected end portions and having journaled to each end portion a main supporting wheel running on said supporting rail and two substantially horizontal lateral guide wheels, one engaging each of said guide rails, said lateral guide rails and wheels being located approximately at the level of the center of gravity of the carrier.

2. In a carrier system the combination with a single supporting track rail and an opposed pair of lateral guide rails, of a carrier provided at each end with a main supporting wheel running on said supporting rail and with two substantially horizontal lateral guide wheels, one engaging each of said guide rails, said lateral guide rails and wheels being located approximately at the level of the center of gravity of the carrier, and the main and guide wheels at each end of the carrier having their axes located in approximately the same plane transverse to the length of the carrier.

3. In a carrier system the combination with a single supporting track rail and an opposed pair of lateral guide rails, of a carrier having rigidly connected end portions and having journaled to each end portion a main supporting wheel running on said supporting rail and two substantially horizontal lateral guide wheels, one engaging each of said guide rails, said lateral guide rails and wheels being located at approximately the level of the center of gravity of the carrier, and a motor secured to one end of said carrier and geared to one of said supporting wheels.

4. In a carrier system the combination with a single supporting track rail and an opposed pair of lateral guide rails, of a carrier having rigidly connected end portions and having journaled to each end portion a main supporting wheel running on said supporting rail and with two substantially horizontal lateral guide wheels, one engaging each of said guide rails, said lateral guide wheels and rails being located at approximately the level of the center of gravity of the carrier, said supporting wheels having rail engaging flanges at both sides and said lateral guide wheels having flanges at their undersides.

5. In a carrier system the combination with a single supporting track rail and an opposed pair of lateral guide rails, of a carrier, comprising a body and cast metal end members to which said body is secured and having journaled in each end member a main supporting wheel running on said supporting rail and two substantially horizontal lateral guide wheels, one engaging each of said guide rails, said lateral guide rails and wheels being located at approximately the level of the center of gravity of the carrier.

BIRNEY C. BATCHELLER.

Witnesses:
JOHN L. CLARK,
GEO. I. MURRAY.

Copies of this patent may be obtained for five cents each, by addressing the "Commissioner of Patents, Washington, D. C."